US011924212B2

(12) United States Patent
Robison, Jr. et al.

(10) Patent No.: US 11,924,212 B2
(45) Date of Patent: Mar. 5, 2024

(54) PROVIDING ACCESS CONTROL TO DISTRIBUTED RESOURCES TO AN INFORMATION HANDLING SYSTEM

(71) Applicant: Dell Products L.P., Round Rock, TX (US)

(72) Inventors: Charles Delbert Robison, Jr., Buford, GA (US); Daniel Lawrence Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 479 days.

(21) Appl. No.: 17/355,788

(22) Filed: Jun. 23, 2021

(65) Prior Publication Data
US 2022/0417248 A1 Dec. 29, 2022

(51) Int. Cl.
*G06F 21/00* (2013.01)
*G06F 21/31* (2013.01)
*H04L 9/40* (2022.01)

(52) U.S. Cl.
CPC ............ *H04L 63/102* (2013.01); *G06F 21/31* (2013.01); *H04L 63/108* (2013.01); *G06F 2221/2103* (2013.01)

(58) Field of Classification Search
CPC . H04L 63/102; H04L 63/108; H04L 63/0846; G06F 21/31; G06F 2221/2103; G06F 21/44; G06F 21/6218
See application file for complete search history.

(56) References Cited

U.S. PATENT DOCUMENTS

| | | | | |
|---|---|---|---|---|
| 9,060,036 | B2 * | 6/2015 | Diab | G06Q 50/01 |
| 2010/0070448 | A1 * | 3/2010 | Omoigui | H01L 27/1463 |
| | | | | 706/55 |
| 2014/0282978 | A1 * | 9/2014 | Lerner | H04L 63/083 |
| | | | | 726/7 |
| 2018/0046502 | A1 * | 2/2018 | Zimmer | G06F 9/4812 |
| 2020/0380112 | A1 * | 12/2020 | Allen | G06F 21/44 |

(Continued)

FOREIGN PATENT DOCUMENTS

| | | | | |
|---|---|---|---|---|
| EP | 2369479 A2 * | 9/2011 | | G06F 21/53 |
| WO | WO-2017053412 A1 * | 3/2017 | | G06F 21/42 |

*Primary Examiner* — Kendall Dolly
(74) *Attorney, Agent, or Firm* — McDermott Will & Emery LLP

(57) ABSTRACT

Providing access control to distributed resources, including storing, at a computing dock coupled to an information handling system, a local access database indicating verified credentials of one or more users; receiving, at the computing dock, a request for access to a resource coupled to the computing dock; providing, in response to the request for access, an authentication request to an authentication system; in response to the authentication request, providing, by the computing dock, an authentication challenge to the information handling system; receiving, at the computing dock and in response to the authentication challenge, user credentials at the authentication system; verifying, at the authentication system, the user credentials against the local access database; providing, based on the verified user credentials, an authorization token to the first device; and allocating, based on the authorization token, access to the resource to the information handling system.

17 Claims, 7 Drawing Sheets

(56) References Cited

U.S. PATENT DOCUMENTS

2021/0306320 A1* 9/2021 Squire ................. H04W 12/084
2022/0377062 A1* 11/2022 Kolodziej ............. G06F 21/575
2023/0376585 A1* 11/2023 Allen .................... G06N 5/013

* cited by examiner

PROVIDING ACCESS CONTROL TO DISTRIBUTED RESOURCES TO AN INFORMATION HANDLING SYSTEM

BACKGROUND

Field of the Disclosure

The disclosure relates generally to an information handling system, and in particular, providing access control to distributed resources to the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are at risk of compromise within any computing environment. Malicious compromise of an information handling system can lead to infiltration of the computing environment, including infiltration of peripherals/resource coupled to the information handling system.

SUMMARY

Innovative aspects of the subject matter described in this specification may be embodied in a method of providing access control to distributed resources, the method comprising: storing, at a computing dock coupled to an information handling system, a local access database indicating verified credentials of one or more users; receiving, at the computing dock, a request for access to a resource coupled to the computing dock; providing, in response to the request for access, an authentication request to an authentication system; in response to the authentication request, providing, by the computing dock, an authentication challenge to the information handling system; receiving, at the computing dock and in response to the authentication challenge, user credentials at the authentication system; verifying, at the authentication system, the user credentials against the local access database; providing, based on the verified user credentials, an authorization token to the first device; and allocating, based on the authorization token, access to the resource to the information handling system.

Other embodiments of these aspects include corresponding systems, apparatus, and computer programs, configured to perform the actions of the methods, encoded on computer storage devices.

These and other embodiments may each optionally include one or more of the following features. For instance, the resource is a monitor. The authentication system is located at the computing dock. The local access database stored at the computing dock is a lightweight directory access protocol (LDAP) database. Provisioning of the computing dock by the information handling system, including caching the database at the storage device during the provisioning. The authorization token is an asymmetric time-based token.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
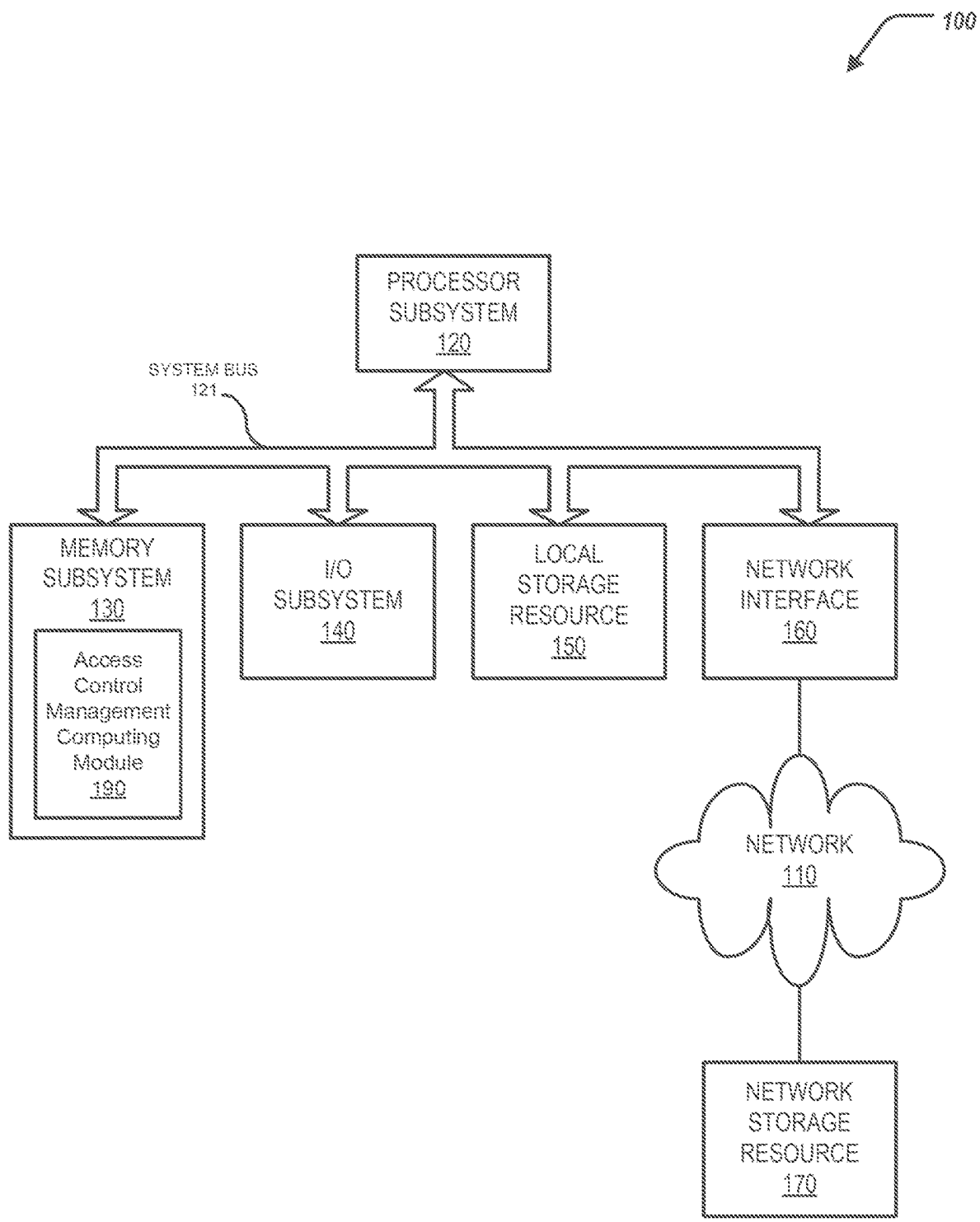
FIG. 1 is a block diagram of selected elements of an embodiment of an information handling system.

This disclosure discusses methods and systems for providing access control to distributed resources to an information handling system. In short, access to a peripheral can be controlled at each independent access point. Thus, an information handling system may or may not have full access to such access points, and will need to be authorized for each independent access point. In other words, access can be delegated to resources (accessible by an information handling system) at each independent access point or peripheral that does not give full authorization to the information handling system to have full access to the peripheral or access point.

Specifically, this disclosure discusses a system and a method for providing access control to distributed resources, including receiving, at a first device coupled to an information handling system, a request for access to a second device; providing, by the first device and to an authentication system, an authentication request to an authentication system; in response to the authentication request, providing an authentication challenge to the information handling system; receiving, in response to the authentication challenge, user credentials; verifying, at the authentication system, the user credentials; providing, based on the verified user credentials, an authorization token to the first device; and allocating, based on the authorization token, access to the second device to the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an access control management computing module 190. The access control management computing module 190 can be included by the memory subsystem 130. The access control management computing module 190 can include a computer-executable program (software). The access control management computing module 190 can be executed by the processor subsystem 120.

In short, the access control management computing module 190 can facilitate access to resources of the information handling system 100, and resources connected to/coupled to the information handling system 100. That is, access to a peripheral can be controlled at each independent access point. Thus, an information handling system may or may not have full access to such access points, and will need to be authorized for each independent access point. In other words, the access control management computing module 190 can delegate access to resources (accessible by an information handling system 100) at each independent access point or peripheral that does not give full authorization to the information handling system to have full access to the peripheral or access point.

Figure 2:
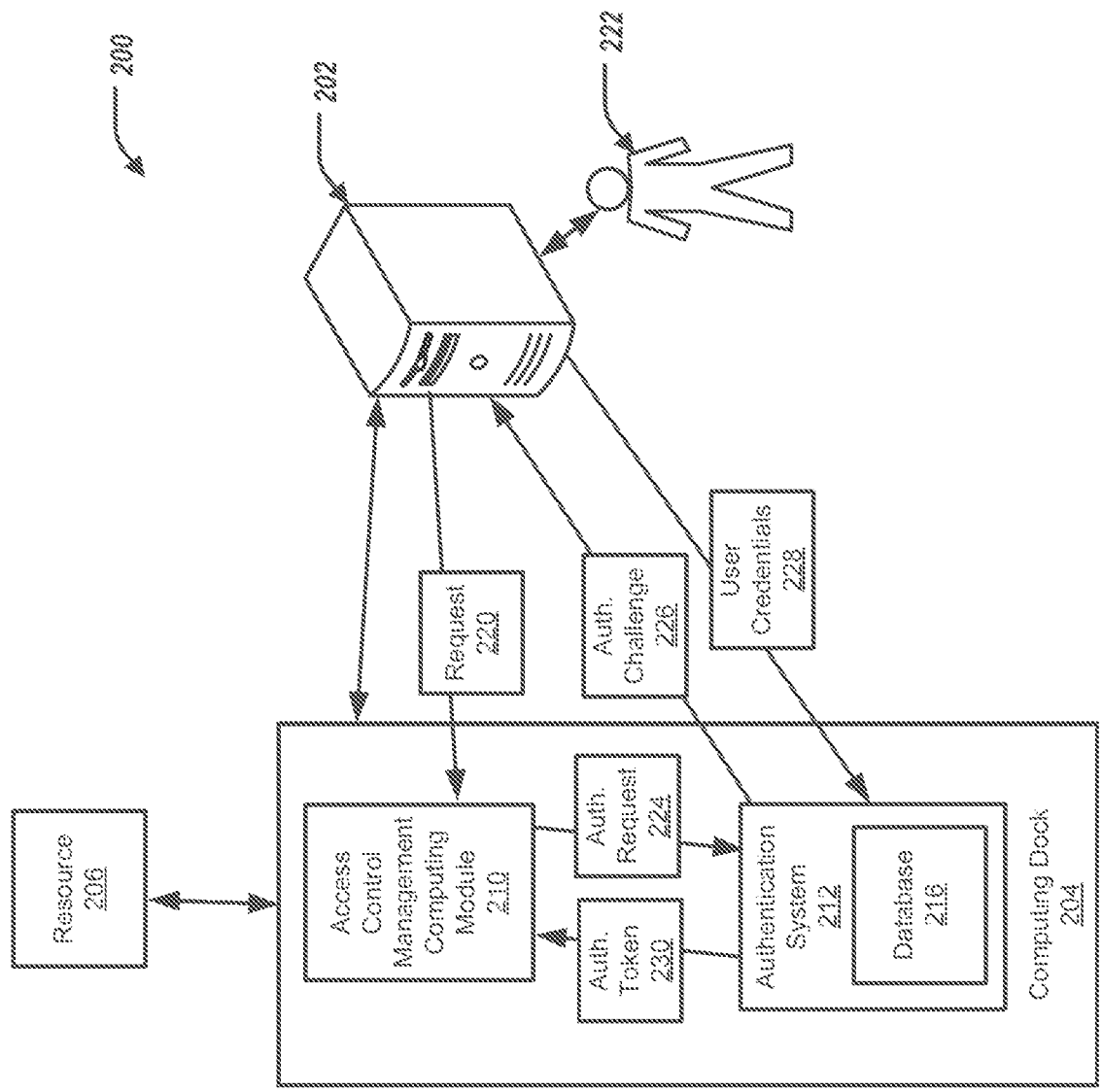
FIGS. 2-4 illustrate respective block diagrams of a computing environment for providing access control to distributed resources.

Turning to FIG. 2, FIG. 2 illustrates an environment 200 for providing access control to distributed resources. The environment 200 can include an information handling system 202, a computing dock 204, and a resource 206. In some examples, the information handling system 202 is similar to, or includes, the information handling system 100 of FIG. 1. In some examples, the computing dock 204 is similar to, or includes, one or more components of the information handling system 100 of FIG. 1. For example, the computing dock 204 can include one or more of the processor subsystem 120, the memory subsystem 130, the I/O subsystem 140, the local storage resource 150, and/or the network interface 160. The computing dock 204 can include an access control management computing module 210 and an authentication system 212. In some examples, the access control management computing module 210 is the same, or substantially the same, as the access control management computing module 190 of FIG. 1.

The information handling system 202 can be in communication with the computing dock 204. The computing dock 204 can further be in communication with the resource 206. In some examples, the resource 206 is a display device (monitor) or a storage device.

In some examples, the authentication system 212 can store a (local access) database 216 (e.g., a lightweight directory access protocol (LDAP)). The database 216 can store data indicating verified credentials of one or more users. That is, the database 216 can be cached at the computing dock 204, e.g., during provisioning of the computing dock 204 by the information handling system 202.

The information handling system 202 can provide a request 220 to the computing dock 204 for access to the resource 206 that is coupled to the computing dock 204. Specifically, a user 222 can interact with the information handling system 202, and provide user input to the information handling system 202 that can be related to the request 220 for access to the resource 206. For example, the user 222 can provide user input that generates the request 220 (e.g., through an application located at the information handling system 202) for access to the resource 206 (e.g., a display device).

The computing dock 204, and specifically, the access control management computing module 210 can receive the request 220. The access control management computing module 210 can provide, in response to the request 220, an authentication request 224 to the authentication system 212.

The authentication system 212, in response to the authentication request 224, provides an authentication challenge 226 to the information handling system 202. Specifically, the authentication challenge 226 can be associated with, and for, the user 222. For example, the authentication challenge 226 can be for user credentials (e.g., user name and password) associated with the user 222 for access to the resource 206. In some examples, the authentication challenge 226 is associated with the resource 206. In some examples, the authentication challenge 226 is specific to the resource 206.

The information handling system 202 can provide, in response to the authentication challenge 226, user credentials 228 to the computing dock 204. In some examples, the user credentials 228 are a user name and password combination. In some examples, the user credentials 228 are a token. The computing dock 204, and specifically, the authentication system 212, can receive the user credentials 228.

The authentication system 212, in response to receiving the user credentials 228, can verify the user credentials 228. Specifically, the authentication system 212 can verify the user credentials 228 against the database 216. When there is a match between the user credentials 228 and verified credentials of the database 216, the authentication system 212 can verify the user credentials 228. That is, the information handling system 202 and the user 222 are verified for access to the resource 206.

The authentication system 212, in response to verifying the user credentials 228 (based on the user credentials 228), can provide an authorization token 230 to the access control management computing module 210 for access to the resource 206 by the information handling system 202. In some examples, the authorization token 230 is an asymmetric time-based token. The access control management computing module 210 can allocate, based on the authorization token 230, access to the resource 206 to the information handling system 202. For example, the information handling system 202 can access the resource 206 through the computing dock 204, or directly.

Figure 3:
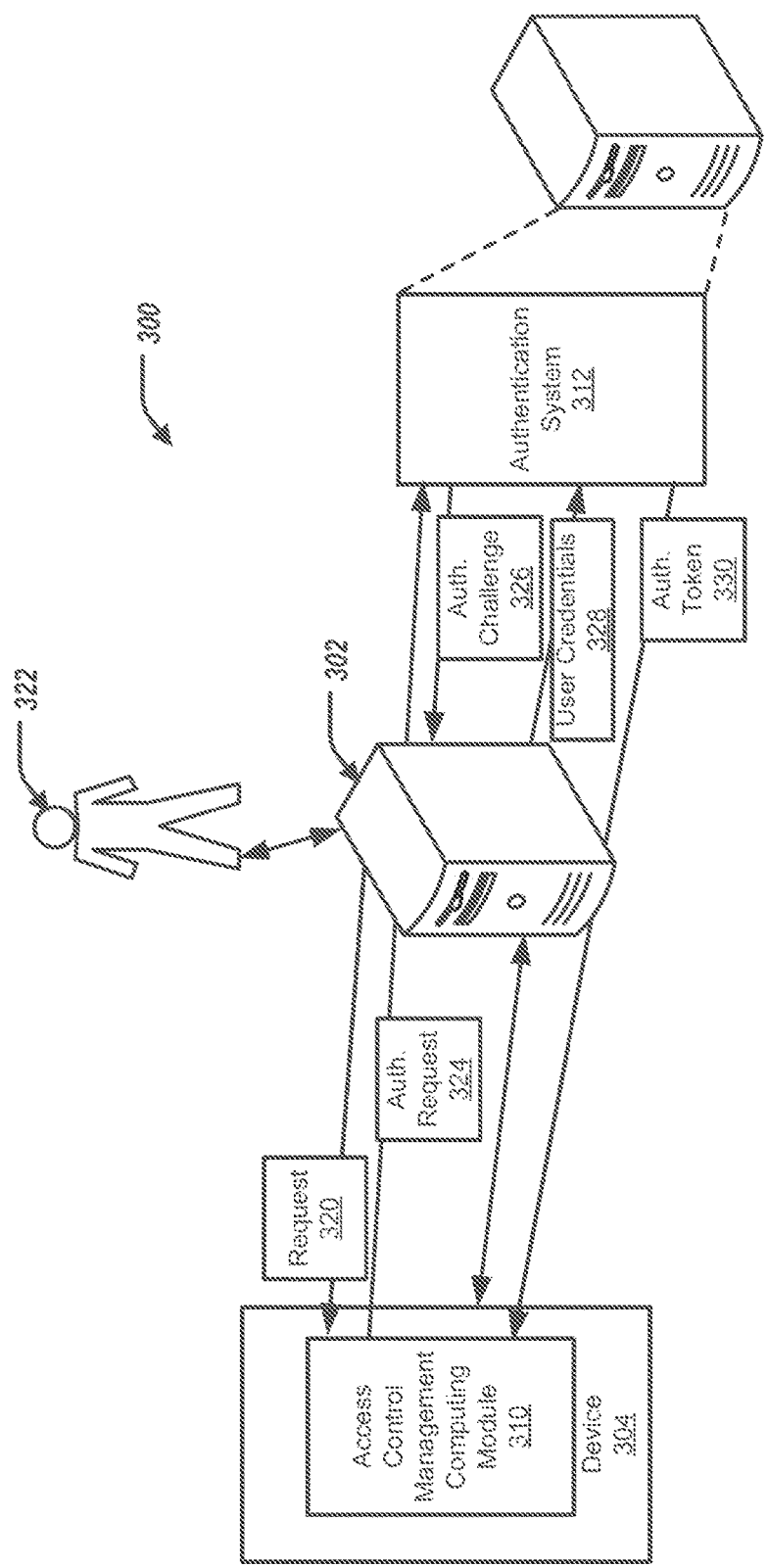

FIG. 3 illustrates an environment 300 for providing access control to distributed resources. The environment 300 can include an information handling system 302, a device 304, and an authentication system 312. In some examples, the information handling system 302 is similar to, or includes, the information handling system 100 of FIG. 1. In some examples, the device 304 is similar to, or includes, one or more components of the information handling system 100 of FIG. 1. For example, the device 304 can include one or more of the processor subsystem 120, the memory subsystem 130, the I/O subsystem 140, the local storage resource 150, and/or the network interface 160.

The device 304 can include an access control management computing module 310. In some examples, the access control management computing module 310 is the same, or substantially the same, as the access control management computing module 190 of FIG. 1.

The authentication system 312 can be separate from the device 304 and the information handling system 302 (e.g., third party). The information handling system 302 can be in communication with the device 304 and the authentication system 312. In some examples, the device 304 is a storage device.

The information handling system 302 can provide a request 320 to the device 304 for access to the device 304. Specifically, a user 322 can interact with the information handling system 302, and provide user input to the information handling system 302 that can be related to the request 320 for access to the device 304. For example, the user 322 can provide user input that generates the request 320 (e.g., through an application located at the information handling system 302) for access to the device 304 (e.g., a storage device).

The device 304, and specifically, the access control management computing module 310 can receive the request 320. The access control management computing module 310 can provide, in response to the request 320, an authentication request 324 to the authentication system 312. In some examples, the device 304 can provide the authentication request 324 through the information handling system 302 to the authentication system 312. Specifically, the device 304 may not have network access to the authentication system 312 (communication between the device 304 and the authentication system 312). As a result, the device 304 can leverage the network interface of the information handling system 302 to provide (transmit) the authentication request 324 to the authentication system 312.

The authentication system 312, in response to the authentication request 324, provides an authentication challenge 326 to the information handling system 302. Specifically, the authentication challenge 326 can be associated with, and for, the user 322. For example, the authentication challenge 326 can be for user credentials (e.g., user name and password) associated with the user 322 for access to the resource 306. In some examples, the authentication challenge 326 is associated with the device 304. In some examples, the authentication challenge 326 is specific to the device 304.

The information handling system 302 can provide, in response to the authentication challenge 326, user credentials 328 to the authentication system 312. In some examples, the user credentials are a user name and password combination. In some examples, the user credentials 328 are a token. The authentication system 312 can receive the user credentials 328.

The authentication system 312, in response to receiving the user credentials 328, can verify the user credentials 328. Specifically, the authentication system 312 can verify the user credentials 328. That is, the information handling system 302 and the user 322 are verified for access to the device 304.

The authentication system 312, in response to verifying the user credentials 328 (based on the user credentials 328), can provide an authorization token 330 to the device 304. In some examples, the authorization token 330 is an asymmetric time-based token. In some examples, the authentication system 312 can provide the authorization token 330 through the information handling system 302 to the device 304. Specifically, the device 304 may not have network access to the authentication system 312 (communication between the device 304 and the authentication system 312). As a result, the device 304 can leverage a network interface of the information handling system 302 to receive the authorization token 330 from the authentication system 312.

The access control management computing module 310 can allocate, based on the authorization token 330, access to the device 304 to the information handling system 202. For example, the information handling system 202 can access the device 304 directly.

Figure 4:
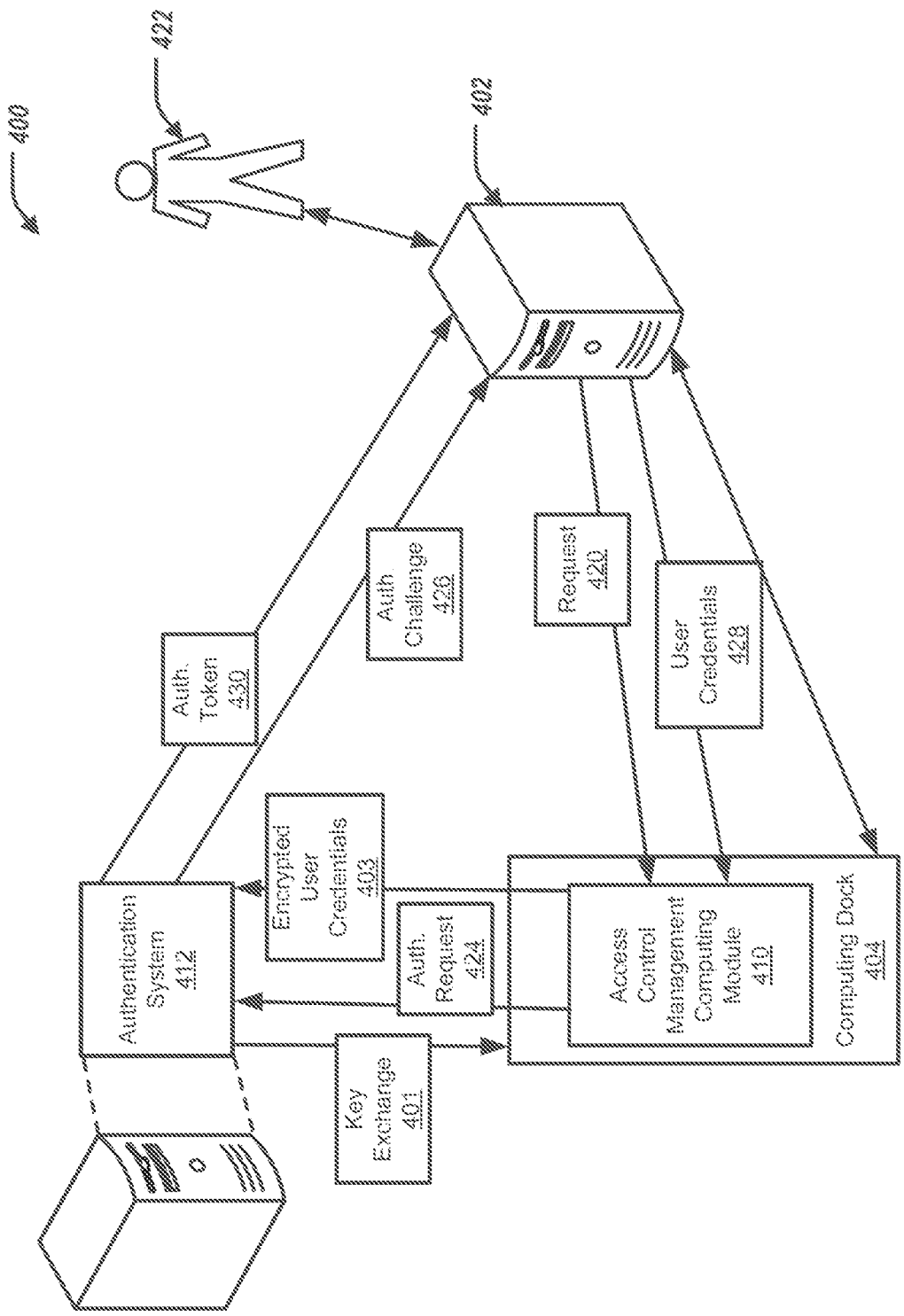

FIG. 4 illustrates an environment 400 for providing access control to distributed resources. The environment 400 can include an information handling system 402, a computing dock 404, and an authentication system 412. In some examples, the information handling system 402 is similar to, or includes, the information handling system 100 of FIG. 1. In some examples, the computing dock 404 is similar to, or includes, one or more components of the information handling system 100 of FIG. 1. For example, the computing dock 404 can include one or more of the processor subsystem 120, the memory subsystem 130, the I/O subsystem 140, the local storage resource 150, and/or the network interface 160.

The computing dock 404 can include an access control management computing module 410. In some examples, the access control management computing module 410 is the same, or substantially the same, as the access control management computing module 190 of FIG. 1.

The information handling system 402 can be in communication with the computing dock 404 and the authentication system 412. The computing dock 204 can further be in communication with the authentication system 412.

The authentication system 412 can asynchronously exchange keys 401 with the computing dock 404.

The information handling system 402 can provide a request 420 to computing dock 404 for access to the computing dock 404 Specifically, a user 422 can interact with the information handling system 402, and provide user input to the information handling system 402 that can be related to the request 420 for access to the computing dock 404. For example, the user 422 can provide user input that generates the request 420 (e.g., through an application located at the information handling system 402) for access to the computing dock 404.

The computing dock 404, and specifically, the access control management computing module 410 can receive the request 420. The access control management computing module 410 can provide, in response to the request 420, an authentication request 424 to the authentication system 212 (e.g., via dock local access network (LAN), a wireless local access network (WLAN), and/or Bluetooth mesh network).

The authentication system 412, in response to the authentication request 424, provides an authentication challenge 426 to the information handling system 202. Specifically, the authentication challenge 426 can be associated with, and for, the user 422. For example, the authentication challenge 426 can be for user credentials (e.g., user name and password) associated with the user 422 for access to the computing dock 404. In some examples, the authentication challenge 426 is associated with the computing dock 404. In some examples, the authentication challenge 426 is specific to the computing dock 404.

The information handling system 402 can provide, in response to the authentication challenge 426, user credentials 428 to the computing dock 404. In some examples, the user credentials are a user name and password combination. In some examples, the user credentials 428 are a token. The computing dock 404, and specifically, the access control management computing module 410, can receive the user credentials 428.

The access control management computing module 410 can encrypt the user credentials 428. For example, the access control management computing module 410 can encrypt the user credentials 428 utilizing the asynchronous key 401. The computing dock 404 can provide encrypted user credentials 403 to the authentication system 412 (e.g., via dock local access network (LAN), a wireless local access network (WLAN), and/or Bluetooth mesh network).

The authentication system 412 can receive the encrypted user credentials 403, and in response, decrypts the encrypted user credentials 403. The authentication system 412 can verify the decrypted user credentials. That is, the information handling system 402 and the user 422 are verified for access to the computing dock 404.

The authentication system 412, in response to verifying the user credentials 403 (based on the user credentials 403), can provide an authorization token 430 to the information handling system 402 for access to the computing dock 404 by the information handling system 402. In some examples, the authorization token 430 is an asymmetric time-based token. The access control management computing module 410 can allocate, based on the authorization token 430, access to the computing dock 404 to the information handling system 402. For example, the information handling system 402 can access the computing dock 404 directly.

Figure 5:
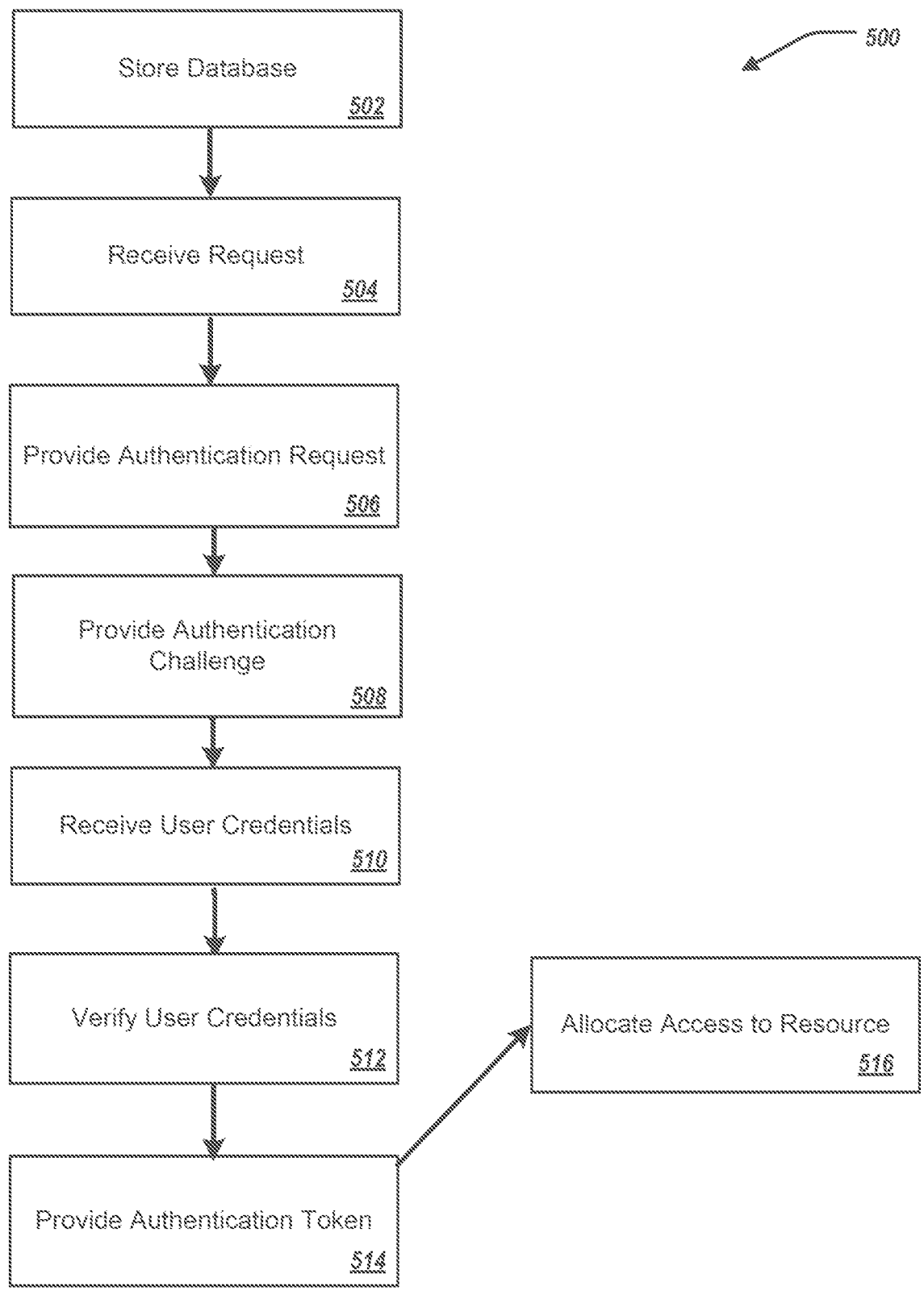
FIGS. 5-7 illustrates respective methods for providing access control to distributed resources.

FIG. 5 illustrates a flowchart depicting selected elements of an embodiment of a method 500 for providing access control to distributed resources. The method 500 may be performed by the information handling system 100, the information handling system 202, the computing dock 204, the access control management computing module 210, the authentication system 212, and/or the resource 206 and with reference to FIGS. 1-2. It is noted that certain operations described in method 500 may be optional or may be rearranged in different embodiments.

The database 216 is stored at the computing dock 204 (502). The request 220 is received at the computing dock 204 for access to the resource 206 (504). The access control management computing module 210 can provide, to the authentication system 212, the authentication request 224 (506). The authentication system 212, in response to the authentication request 224, can provide the authentication challenge 226 to the information handling system 202 (508). The authentication system 212 can receive, in response to the authentication challenge 226, the user credentials 228 (510). The authentication system 212 can verify the user credentials 228 (512). The authentication system 212 can provide, based on the verified user credentials 228, the authorization token 230 to the access control management computing module 210 (514). The access control management computing module 210 can allocate, based on the authorization token 230, access to the resource 206 to the information handling system 202 (516).

Figure 6:
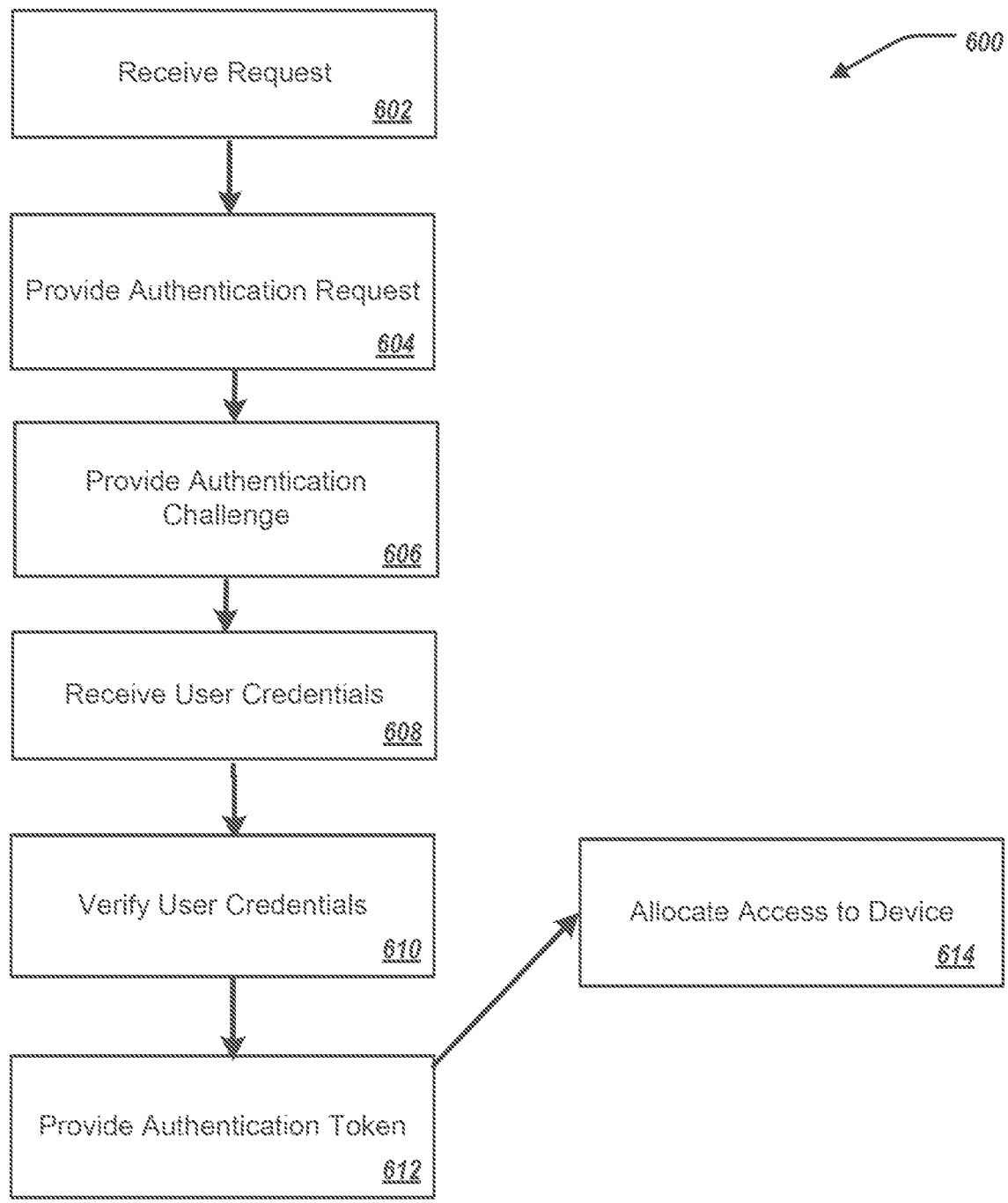

FIG. 6 illustrates a flowchart depicting selected elements of an embodiment of a method 600 for providing access control to distributed resources. The method 600 may be performed by the information handling system 100, the information handling system 302, the device 304, the access control management computing module 310, and/or the authentication system 312, and with reference to FIGS. 1 and 3. It is noted that certain operations described in method 600 may be optional or may be rearranged in different embodiments.

The request 320 is received by the device 304 for access to the device 304 (602). The device 304 provides the authentication request 324 to the authentication system 312 (604). In some examples, the device 304 provides the authentication request 324 through the information handling system 302 (e.g., utilizing a network interface of the information handling system 302). The authentication system 312, in response to the authentication request 324, can provide the authentication challenge 326 to the information handling system 302 (606). The authentication system 312 can receive, in response to the authentication challenge 326, the user credentials 328 (608). The authentication system 312 can verify the user credentials 328 (610). The authentication system 312 can provide, based on the verified user credentials 328, the authorization token 330 to the device 304 (612). The access control management computing module 310 can allocate, based on the authorization token 330, access to the device 304 to the information handling system 302 (614).

Figure 7:
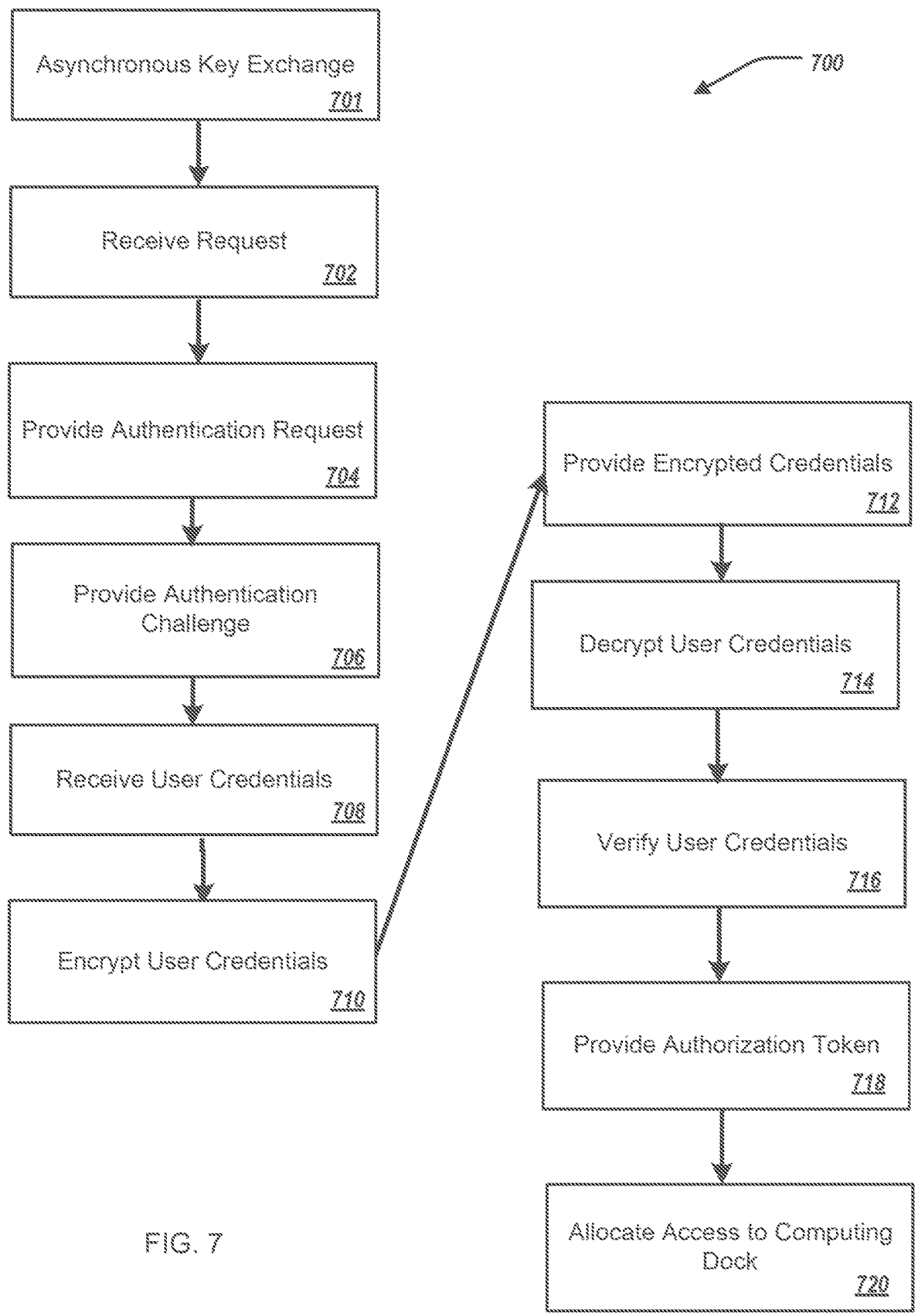

FIG. 7 illustrates a flowchart depicting selected elements of an embodiment of a method 700 for providing access control to distributed resources. The method 700 may be performed by the information handling system 100, the information handling system 402, the computing dock 404, the access control management computing module 410, and/or the authentication system 412, and with reference to FIGS. 1 and 4. It is noted that certain operations described in method 700 may be optional or may be rearranged in different embodiments.

The authentication system 412 can perform an asynchronous key exchange 401 with the computing dock 404 (701). The request 420 is received at the computing dock 404 for access to the computing dock 404 (702). The access control management computing module 410 can provide, to the authentication system 412, the authentication request 424 (704). The authentication system 412, in response to the authentication request 424, can provide the authentication challenge 426 to the information handling system 402 (706). The access control management computing module 410 can receive, in response to the authentication challenge 426, the user credentials 428 (708). The access control management computing module 410 can encrypt the user credentials 428

(710). The computing dock can provide the encrypted user credentials 403 to the authentication system 412 (712). The authentication system 412 can decrypt the encrypted user credentials 403 (714). The authentication system 412 can verify the user credentials (716). The authentication system 412 can provide, based on the verified user credentials 428, the authorization token 430 to the information handling system (718). The access control management computing module 410 can allocate, based on the authorization token 430, access to the computing dock 404 to the information handling system 402 (720).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of providing access control to distributed resources, the method comprising:
    storing, at a computing dock coupled to an information handling system, a local access database indicating verified credentials of one or more users;
    receiving, at the computing dock, a request for access to a resource coupled to the computing dock;
    providing, in response to the request for access, an authentication request to an authentication system;
    in response to the authentication request, providing, by the computing dock, an authentication challenge to the information handling system;
    receiving, at the computing dock and in response to the authentication challenge, user credentials at the authentication system;
    verifying, at the authentication system, the user credentials against the local access database;
    providing, based on the verified user credentials, an authorization token to the first device; and
    allocating, based on the authorization token, access to the resource to the information handling system.

2. The computer-implemented method of claim 1, wherein the resource is a monitor.

3. The computer-implemented method of claim 1, wherein the authentication system is located at the computing dock.

4. The computer-implemented method of claim 1, wherein the local access database stored at the computing dock is a lightweight directory access protocol (LDAP) database.

5. The computer-implemented method of claim 1, further comprising:
    provisioning of the computing dock by the information handling system, including caching the database at the storage device during the provisioning.

6. The computer-implemented method of claim 1, wherein the authorization token is an asymmetric time-based token.

7. A computer-implemented method of providing access control to distributed resources, the method comprising:
    receiving, at a device coupled to an information handling system, a request for access to the resource;
    providing, by the device, an authentication request to an authentication system, wherein the device provides the authentication request through the information handling system to the authentication system;
    in response to the authentication request, providing, by the authentication system, an authentication challenge to the information handling system;
    receiving, at the authentication system and in response to the authentication challenge, user credentials at the authentication system;
    verifying, at the authentication system, the user credentials;
    providing, based on the verified user credentials, an authorization token to the device, wherein the authorization token is provided through the information handling system to the device; and
    allocating, based on the authorization token, access to the device to the information handling system.

8. The computer-implemented method of claim 7, wherein the device is a monitor.

9. The computer implemented method of claim 7, wherein the device is a storage device.

10. The computer-implemented method of claim 7, wherein the device does not have network access to the authentication system.

11. The computer-implemented method of claim 10, wherein the device leverages network capabilities of the information handling system for communication with the authentication system.

12. The computer-implemented method of claim 7, wherein the authentication system is separate from the information handling system and separate from the device.

13. The computer-implemented method of claim 7, wherein the authorization token is an asymmetric time-based token.

14. A computer-implemented method of providing access control to distributed resources, the method comprising:
    receiving, at a computing dock coupled to an information handling system, a request for access to the computing dock;

providing, by the computing dock, an authentication request to an authentication system;

in response to the authentication request, providing, by the authentication system, an authentication challenge to the information handling system;

receiving, at the computing dock and in response to the authentication challenge, user credentials at the computing dock;

encrypting, at the computing dock, the user credentials;

providing, by the computing dock, the encrypted user credentials to the authentication system;

decrypting, at the authentication system, the encrypted user credentials verifying, at the authentication system, the decrypted user credentials;

providing, based on the verified user credentials, an authorization token to the information handling system; and allocating, based on the authorization token, access to the resource to the information handling system.

15. The computer-implemented method of claim 14, further comprising exchanging asynchronous keys between the authentication system and the computing dock prior to receiving the request for access to the computing dock.

16. The computer-implemented method of claim 14, wherein the authentication system is separate from the information handling system and separate from the device.

17. The computer-implemented method of claim 14, wherein the authorization token is an asymmetric time-based token.

* * * * *